United States Patent
Kim et al.

(10) Patent No.: US 11,145,926 B2
(45) Date of Patent: Oct. 12, 2021

(54) BATTERY BLOCK FOR VEHICLE

(71) Applicant: KOREA ELECTRIC TERMINAL CO., LTD., Incheon-si (KR)

(72) Inventors: Ja-Min Kim, Incheon-si (KR); Ki-Taek Kim, Seoul (KR)

(73) Assignee: KOREA ELECTRIC TERMINAL CO., LTD., Incheon (KR)

( * ) Notice: Subject to any disclaimer, the term of this patent is extended or adjusted under 35 U.S.C. 154(b) by 1412 days.

(21) Appl. No.: 14/981,318

(22) Filed: Dec. 28, 2015

(65) Prior Publication Data

US 2016/0185223 A1    Jun. 30, 2016

(30) Foreign Application Priority Data

Dec. 30, 2014  (KR) .......................... 10-2014-0194250

(51) Int. Cl.
*H01M 50/20*   (2021.01)
*B60K 1/04*    (2019.01)
(Continued)

(52) U.S. Cl.
CPC ............... *H01M 50/20* (2021.01); *B60K 1/04* (2013.01); *B60R 16/023* (2013.01); *H01H 85/00* (2013.01);
(Continued)

(58) Field of Classification Search
CPC ........ H01M 2/1083; H01M 2/02; H01M 2/10; H01M 2/30; H01M 2/60; H01M 2/70;
(Continued)

(56) References Cited

U.S. PATENT DOCUMENTS 6,178,106 B1 *   1/2001   Umemoto ............... H01R 11/12
                                                  363/146
2006/0216592 A1 *  9/2006   Chun .................. H01M 2/0404
                                                  429/175
(Continued)

FOREIGN PATENT DOCUMENTS

CN     201887094 U       6/2011
KR     20-0444123 Y1     4/2009
WO     WO-2013069525 A1 *  5/2013  .......... H01M 2/1077

OTHER PUBLICATIONS

Translation of Xiaomeng et al. CN2018870947 obtained from Espacenet (original document cited in the IDs and provided by the Applicant).*

*Primary Examiner* — Milton I Cano
*Assistant Examiner* — Kiran Akhtar
(74) *Attorney, Agent, or Firm* — Novick, Kim & Lee, PLLC; Jae Youn Kim (57) ABSTRACT

Provided is a battery block for a vehicle. The battery block includes: a main body (10) provided with an installation space (11') therein for receiving components; and an upper casing (50) mounted to an upper part of the main body (10), an inside of the upper casing mounted to an upper part of a vehicle battery (100), wherein the main body (10) is provided with at least one step (11) along a longitudinal direction of the main body (10) such that heights of opposite sides of the step (11) are different from each other. The main body (10) has a relatively short section with a same height, and therefore rigidity thereof is increased, whereby bending or torsion of the casing is reduced. Thus, durability of the battery block is improved.

8 Claims, 9 Drawing Sheets (51) Int. Cl.
  *H01M 10/46* (2006.01)
  *H01H 85/00* (2006.01)
  *H02G 3/08* (2006.01)
  *B60R 16/023* (2006.01)

(52) U.S. Cl.
  CPC ........ *H01M 10/46* (2013.01); *H01M 2220/20* (2013.01); *H02G 3/08* (2013.01); *Y02E 60/10* (2013.01); *Y02T 10/70* (2013.01)

(58) Field of Classification Search
  CPC ............. H01M 10/46; H01M 2220/20; H01M 2002/0205; H01M 50/20; B60K 1/04; B60R 16/023; H02G 3/08; Y02E 60/10; Y02T 10/70
  USPC ........................................................ 429/100
  See application file for complete search history.

(56) References Cited

U.S. PATENT DOCUMENTS

| | | | | |
|---|---|---|---|---|
| 2008/0124618 | A1* | 5/2008 | Shimoyama | H01M 2/105 429/99 |
| 2009/0155631 | A1* | 6/2009 | Baek | H01M 2/0207 429/7 |
| 2013/0011718 | A1* | 1/2013 | Hsiao | H01M 2/1077 429/159 |
| 2013/0288097 | A1* | 10/2013 | Kawatani | H01M 2/1083 429/100 |
| 2014/0315441 | A1* | 10/2014 | Kinoshita | H01M 2/1077 439/627 |

\* cited by examiner

BATTERY BLOCK FOR VEHICLE

CROSS REFERENCE TO RELATED APPLICATION

The present application claims priority to Korean Patent Application No. 10-2014-0194250, filed Dec. 30, 2014, the entire contents of which is incorporated herein by reference.

BACKGROUND OF THE INVENTION

Field of the Invention

The present invention generally relates to a battery block for a vehicle and, more particularly, to a battery block for a vehicle that is mounted to a vehicle battery, wherein the battery block distributes electricity from the vehicle battery to each component that is placed within a vehicle.

Description of the Related Art

Generally, a vehicle battery mounted in a vehicle is used as a power source for a starter motor, ignition of an engine, lights, and other electric devices regardless of whether the engine is a gasoline or diesel type. Recently, vehicles have become more luxurious, and electric devices installed inside a vehicle have become more complex. Thus, an electric box for a vehicle for distribution of electric power is widely used by connecting the electric box directly to a battery.

The electric box for a vehicle is a collection of fuses and other electronic components relating to various electric devices. For example, the electric box prevents overcurrent from flowing in various electric devices.

However, a casing of the electric box for a vehicle is made of a synthetic resin through injection molding, so the casing of the electric box may be easily bent or deformed when an external force is exerted thereon. In particular, the casing of the electric box is problematic in that the case for the electric box for a vehicle is directly connected to a battery, which may result in more severe deformation of the casing due to heat generated from electric devices that are mounted in the casing.

Further, it is important for a terminal that is provided in the electric box to serve as an electric connection means, remaining stable within the electric box. To achieve this, a holder as an additional element is used to prevent deformation of a terminal lance of the electric box by pushing the lance. However, the holder is problematic in that the holder may not efficiently fasten the lance as the holder may not push the lance accurately due to a gap therebetween, wherein the gap is defined to reduce the insertion force of the holder.

Furthermore, the electric box for a vehicle is problematic in that a plurality of components are mounted to the electric box and there are many components having a similar appearance, whereby a worker may have difficulty in recognizing assembly locations of the components in an assembly process.

The foregoing is intended merely to aid in the understanding of the background of the present invention, and is not intended to mean that the present invention falls within the purview of the related art that is already known to those skilled in the art.

DOCUMENTS OF RELATED ART (Patent Document) Korean Utility Model Registration No. 20-0444213

SUMMARY OF THE INVENTION

Accordingly, the present invention has been made keeping in mind the above problems occurring in the related art, and the present invention is intended to propose a battery block for a vehicle, wherein a casing of the battery block is provided with a step so as to increase the strength of the casing.

The present invention is also intended to propose a battery block for a vehicle, wherein a terminal holder accurately pushes and supports a terminal lance by narrowing a gap between the terminal holder that is mounted to the battery block and the terminal lance that is provided within the battery block.

The present invention is further intended to propose a battery block for a vehicle, wherein each shape of components that are seated in the battery block corresponds to each shape of seating spaces defined inside the battery block, thereby avoiding misassembly of components.

To achieve the object mentioned hereinbefore, there is provided a battery block for a vehicle according to the present invention, the battery block including: a main body provided with an installation space therein for receiving components; and an upper casing mounted to an upper part of the main body, an inside of the upper casing mounted to an upper part of a vehicle battery, wherein the main body is provided with at least one step along a longitudinal direction of the main body such that heights of opposite sides of the step are different from each other.

The main body may be in a repeated convex-concave shape that extends with different heights due to the step.

The main body may include: a mounting space that is open downwardly; a cantilever lance elastically deformably provided in the mounting space and configured to hold an end of a wire terminal by catching the end of the wire terminal; and a front holder selectively mounted to the mounting space so as to prevent or allow elastic deformation of the lance.

One side of the lance may be provided with an inclined rib by protruding, the inclined rib corresponding to a pushing part of the front holder, wherein the inclined rib may be configured to be inclined toward the pushing part of the front holder such that when the front holder is mounted to the mounting space, an outer surface of an inclined rib of the front holder comes into close contact with an outer surface of the inclined rib of the lance.

The installation space of the main body may be provided with a plurality of terminal seats, wherein shapes of the terminal seats are different from each other depending on shapes of power supply terminals that are seated in the respective terminal seats.

A partition fence may be provided between each of the terminal seats and a neighboring terminal seat by protruding, with a distinction guide being provided on an end of the partition fence by protruding, wherein the terminal seats may have respective distinction guides different from each other in shapes and numbers such that the shapes of the plurality of the terminal seats are different from each other.

The main body may include: a locking protrusion, the locking protrusion being inserted into a locking hole on a bus bar; a pair of locking fingers elastically deformably provided on the locking protrusion in such a manner that the locking fingers are moved in opposed or opposite directions to be closed to or remote from each other; and a reinforcing rib provided by protruding on an outer surface of each locking finger along a longitudinal direction thereof.

An edge of the locking hole that is provided on the bus bar and is engaged with the locking protrusion may have a chamfer that makes a sloping edge.

A wire locking piece may be provided on the main body by protruding at a location adjacent to a location where each of the power supply terminals or the wire terminal is mounted, an evasion space may be provided on each of opposite sides of the wire locking piece so as to form an opening for allowing a locking means to pass therethrough, and a protruding rib may be provided on a rear surface of the wire locking piece along a longitudinal direction of the wire locking piece.

The advantages of the battery block for a vehicle according to the present invention are as follows.

The main body is provided with a plurality of the steps along a longitudinal direction of the main body such that the main body has a relatively short section with the same height, and therefore rigidity thereof is increased, whereby bending or torsion of the casing of the battery block is decreased. Thus, durability of the battery block is increased.

Further, according to the present invention, the inclined rib protrudes so as to come into close contact with the front holder without a gap, wherein the inclined rib is provided in the lance that is provided in the mounting space where the wire terminal is inserted. Thus, the front holder may support the lance firmly so that a locked state of the wire terminal can be stably maintained, whereby operation reliability of the battery block for a vehicle may be increased.

Further, according to the present invention, each shape of a plurality of the terminal seats that are provided in the installation space of the main body corresponds to each shape of a plurality of the power supply terminals that are seated in the terminal seats. Thus, it is possible to prevent misassembly of the power supply terminals, thereby realizing improved efficiency in assembling the battery block for a vehicle.

Furthermore, according to the present invention, the reinforcing rib is provided in the locking protrusion that is used to lock the bus bar, whereby the strength of the locking protrusion may be increased. The locking hole on the bus bar has a chamfer, whereby it is possible to prevent an outer surface of the locking protrusion from being damaged in a process of assembling/disassembling the bus bar. Thus, durability of the battery block for a vehicle may be increased.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Reference will now be made in greater detail to battery block for a vehicle according to an exemplary embodiment of the present invention in conjunction with the accompanying drawings.

According to the accompanying drawings, an exterior and a frame of a battery block for a vehicle are dependent on a main body 10 and an upper casing 50. The main body 10 and the upper casing 50 are in a quasi-hexahedral shape respectively, wherein the upper casing 50 is mounted to an upper part of the main body 10, forming a single three dimensional shape.

A plurality of electric devices are received between the main body 10 and the upper casing 50, wherein the upper casing 50 is mounted to an upper part of a vehicle battery 100 so as to electrically connect the electric devices within the upper casing 50 and a terminal post (a terminal) of the vehicle battery. For reference, the battery 100 is a general automotive battery, so detailed description thereof will be omitted.

Figure 1:
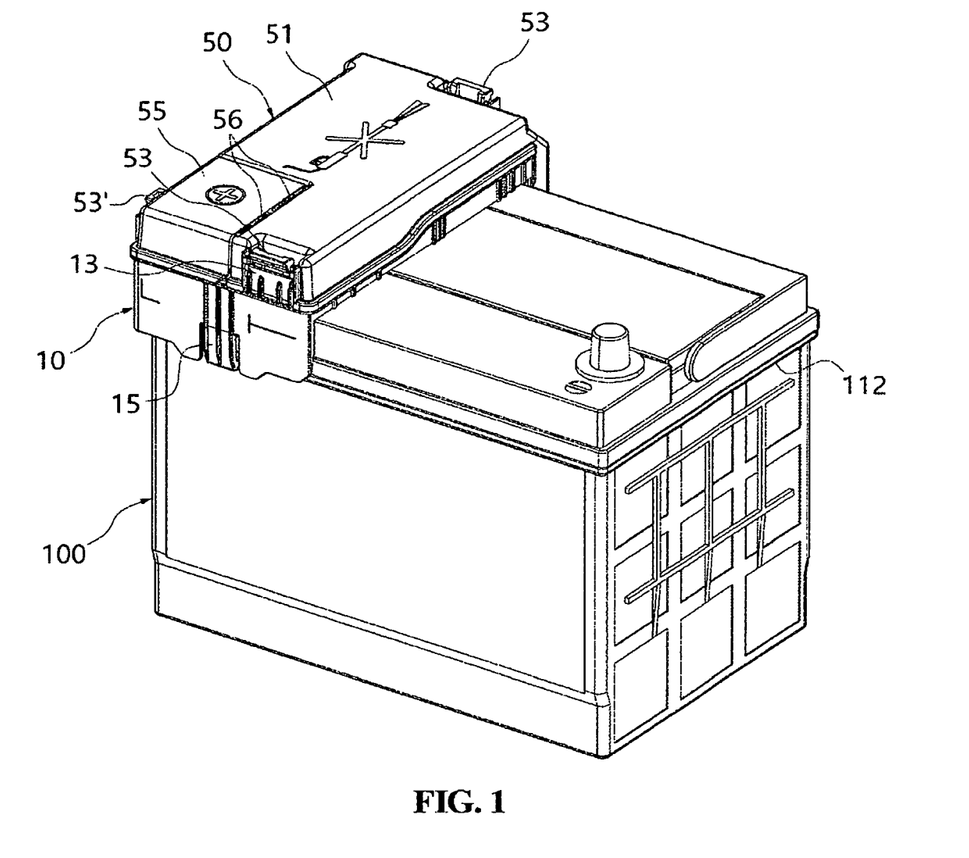
FIG. 1 is a perspective view showing a battery block for a vehicle according to an embodiment of the present invention, the battery block being applied to a vehicle battery.
Figure 2:
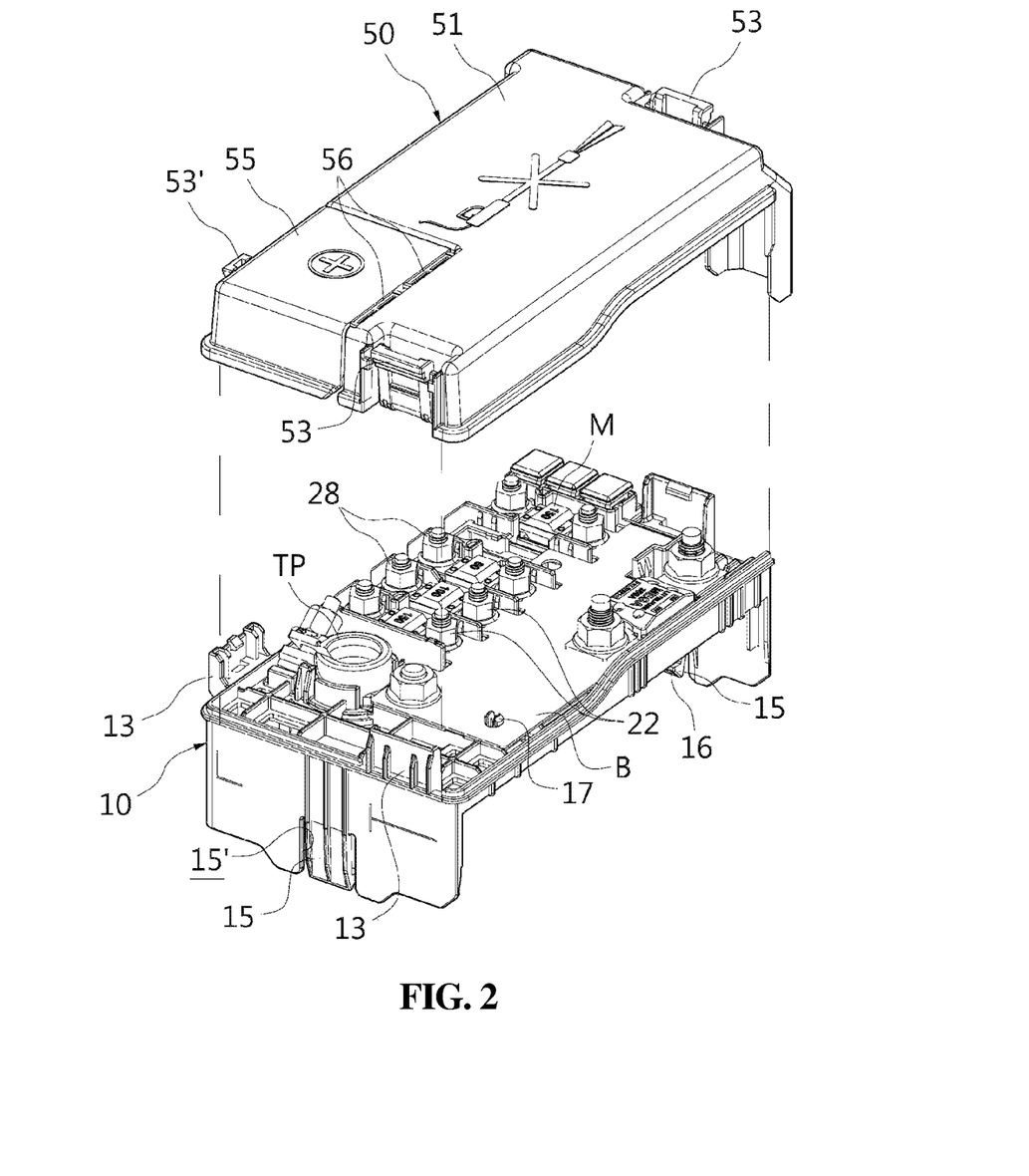
FIG. 2 is an exploded perspective view showing a configuration of the battery block according to the embodiment of the present invention.

To describe the main body 10, as shown in FIG. 2, the main body 10 is in a quasi-hexahedral shape, wherein the plurality of electric devices are received in an installation space 11' that is provided in an inside of the main body 10. The main body 10 is coupled to the upper casing 50 that is mentioned hereinbelow in a state where a plurality of components are seated on an upper surface of the main body 10, thereby covering the components.

Figure 3:
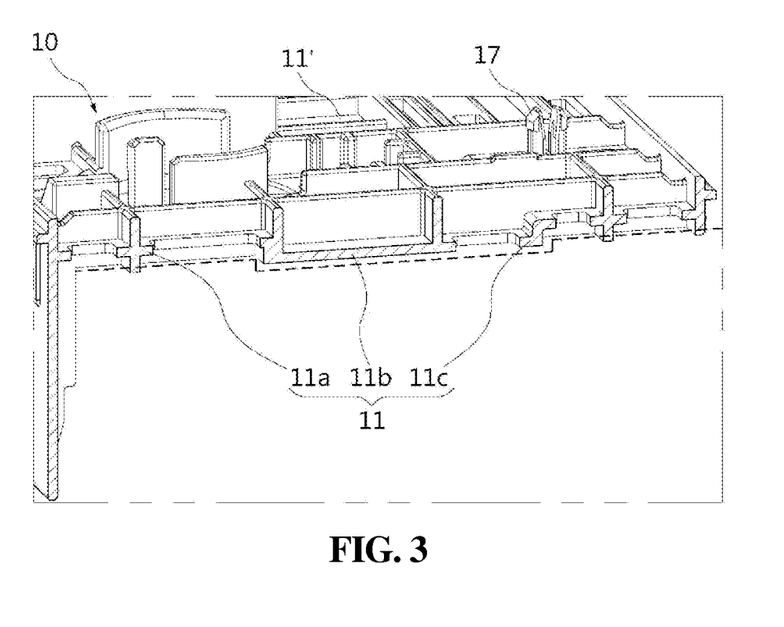
FIG. 3 is a sectional view showing a configuration of a main body according to the embodiment of the present invention.

FIG. 3 is a view showing a portion of the installation space 11' in the main body 10. As shown in FIG. 3, the upper part of the main body 10 is configured to be sectioned so as to receive the plurality of components therein.

Here, as shown in a sectional portion of FIG. 3, the main body 10 is provided with at least one step 11, wherein heights of opposite sides of the step 11 are different from each other.

To be more specific, the main body 10 is in a repeated convex-concave shape that extends with different heights due to the step 11. As shown in FIG. 3, the main body 10 is not a plane that extends in one direction, and the heights of the opposite sides of the step 11 are different from each other, wherein a virtual extension line (a dotted line of FIG. 3), which connects the steps, is in a quasi convex-concave shape 11a, 11b, and 11c. Thereby, the main body 10 has a relatively short section with a same height, and therefore rigidity thereof is increased. Thus, bending or torsion of the battery block for a vehicle is reduced. Of course, the main body 10 may be provided with a single step 11, wherein a length of a section that is divided by the step 11 may be variable.

According to an embodiment of the present invention, the step 11 is provided along a longitudinal direction of the main body 10. In other words, the step 11 is provided along the longitudinal direction of the main body 10, wherein the longitudinal direction of the main body 10 is inclined to be bent easily due to a relatively long length thereof.

As shown in FIG. 2, the main body 10 is provided with a plurality of coupling elements 13. The coupling elements 13 are elastically deformably provided by cantilevering from the main body 10, and the coupling elements 13 are coupled to a coupling lever 53 mentioned hereinbelow of the upper casing 50 so as to be capable of allowing the main body 10 and the upper casing 50 to be assembled.

Figure 4:
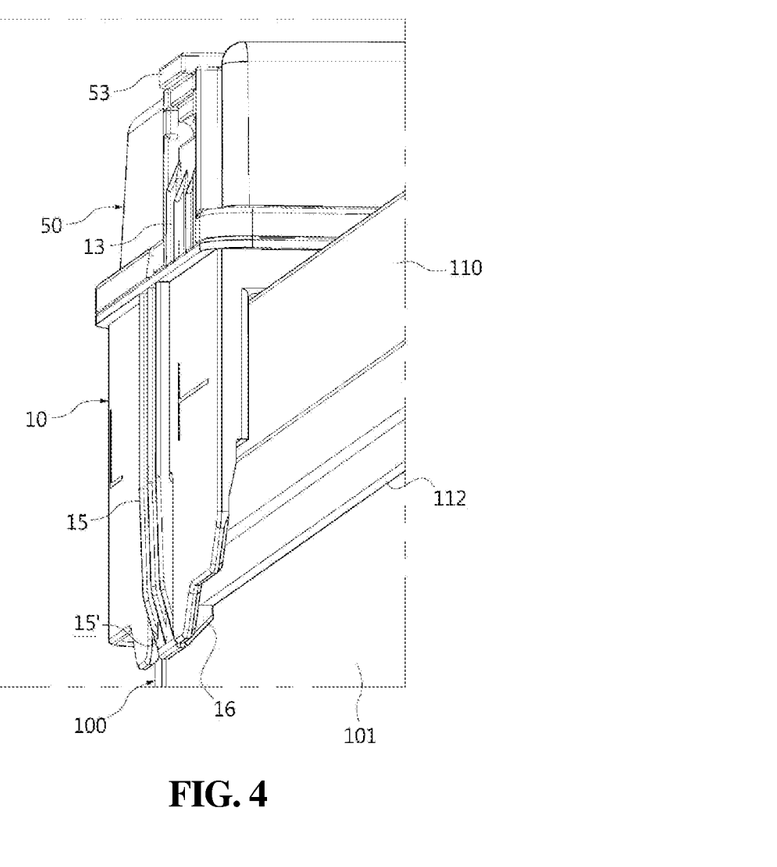
FIG. 4 is a perspective view of an essential portion showing a connection between the battery block for a vehicle according to the embodiment of the present invention and a vehicle battery.

The main body 10 is provided with a locking piece 15. As shown in FIGS. 2 and 4, the locking piece 15 is provided by cantilevering in a downward direction of the main body 10 so as to be capable of being elastically deformed. A reference numeral 15' refers to an elastic deformation slit, wherein the elastic deformation slit 15' is provided on opposite sides of the locking piece 15 so that the locking piece 15 can be elastically deformed with ease.

The locking piece 15 is locked to the vehicle battery 100 so as to allow the battery block to be coupled to the vehicle battery 100, wherein according to the embodiment of the present invention, a total of two locking pieces 15 are provided on opposite sides of the main body 10, respectively. As shown in FIG. 4, one end of the locking piece 15 is provided with a connecting protrusion 16, wherein the connecting protrusion 16 is locked to a protruding ridge 112 that is provided on an upper casing of the vehicle battery 100 so that the vehicle battery 100 and the battery block can be coupled together. Here, an outer surface of the locking piece 15 is provided with a supporting rib (reference numeral not given), wherein the supporting rib increases strength of the locking piece 15 by protruding from the outer surface of the locking piece 15.

The installation space 11' in the main body 10 is provided with a bus bar B. As shown in FIG. 2, the bus bar B as a metal substrate distributes large electric current, wherein the bus bar B is connected to a plurality of power supply terminals 25A to 25D so as to distribute electricity transmitted from the battery to the plurality of the power supply terminals 25A to 25D.

Figure 5A:
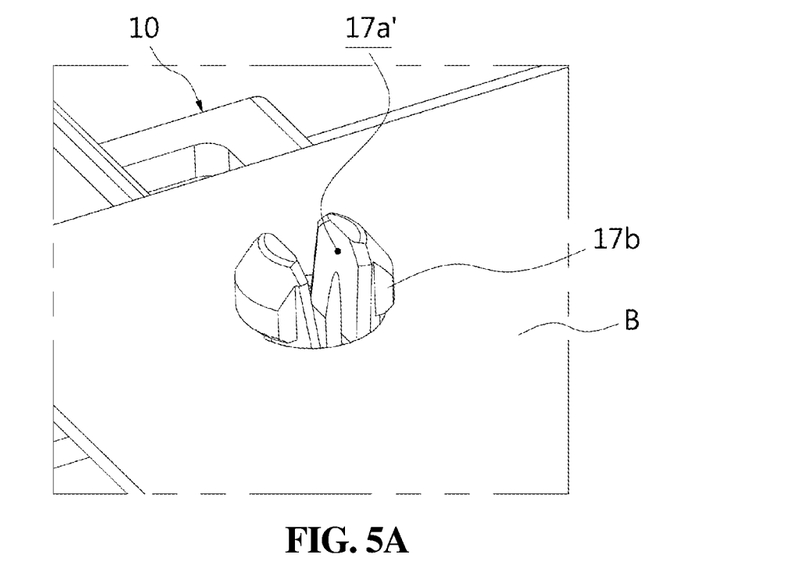
FIG. 5A is a perspective view of an essential portion showing a state where the bus bar according to the embodiment of the present invention is coupled to a coupling protrusion on a main body.
Figure 5B:
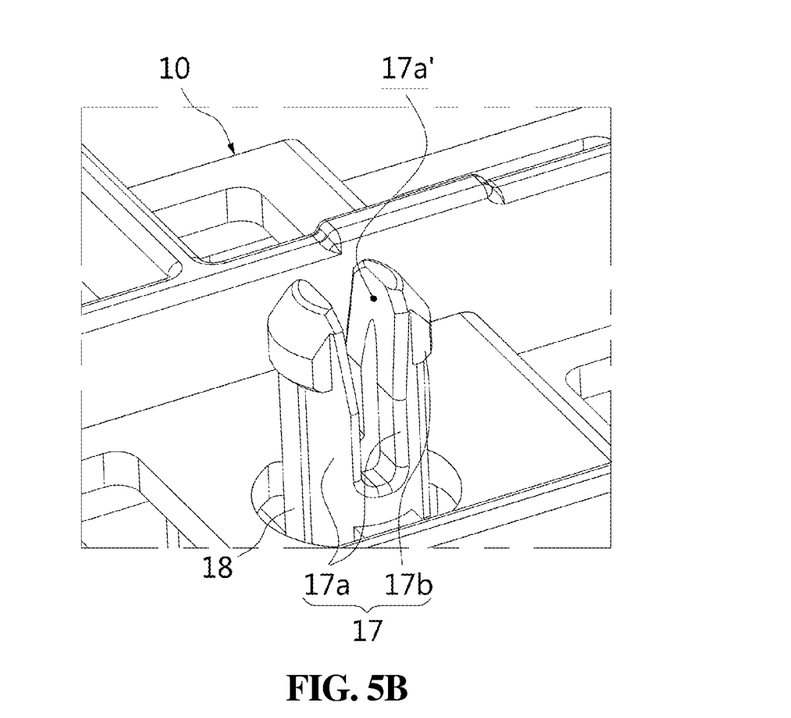
FIG. 5B is a perspective view of an essential portion showing a configuration of the coupling protrusion that is provided on the main body according to the embodiment of the present invention.

As shown in FIGS. 5A and 5B, the bus bar B is provided with a locking hole (reference numeral not given), wherein a locking protrusion 17 that is provided on the main body 10 is inserted into the locking hole on the bus bar B so as to fasten the bus bar B.

Here, a pair of locking fingers 17a are elastically deformably provided on the locking protrusion 17 in such a manner that the locking fingers 17a are moved to be close to or moved apart from each other via a deformation space 17a' that is provided between the locking fingers 17a so that the pair of the locking fingers 17a can be elastically deformed to be close to each other.

Further, a locking head 17b is provided on an upper part of the locking fingers 17a, wherein the locking head 17b protrudes in such a manner that the locking head 17b thickens the locking protrusion 17 so as to prevent the locking protrusion 17 from deviating from the locking hole on the bus bar B. An outer surface of the locking head 17b is inclined so that the locking head 17b can be easily inserted through the locking hole on the bus bar B.

As shown in FIG. 5B, a reinforcing rib 18 is provided on an outer surface of the locking fingers 17a by protruding. The reinforcing rib 18 increases rigidity of the locking fingers 17a so as to prevent the bus bar B from being separated due to elastic deformation of the locking fingers 17a. The reinforcing rib 18 may be provided along a longitudinal direction of the locking fingers 17a.

Not shown in the drawings, an edge of the locking hole that is provided on the bus bar B and is engaged with the locking protrusion 17 has a chamfer that makes a sloping edge. In other words, the edge of the locking hole on the bus bar B, the edge as an entrance where the locking protrusion 17 is engaged when the locking protrusion 17 is inserted into the locking hole, has the chamfer that makes a sloping edge.

Figure 6A:
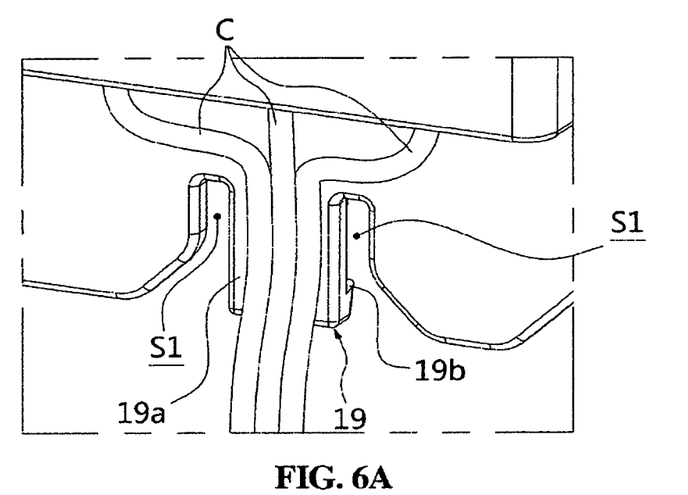
FIG. 6A is a perspective view of an essential portion showing a state where a bundle of wires is locked to a wire locking piece according to the embodiment of the present invention.
Figure 6B:
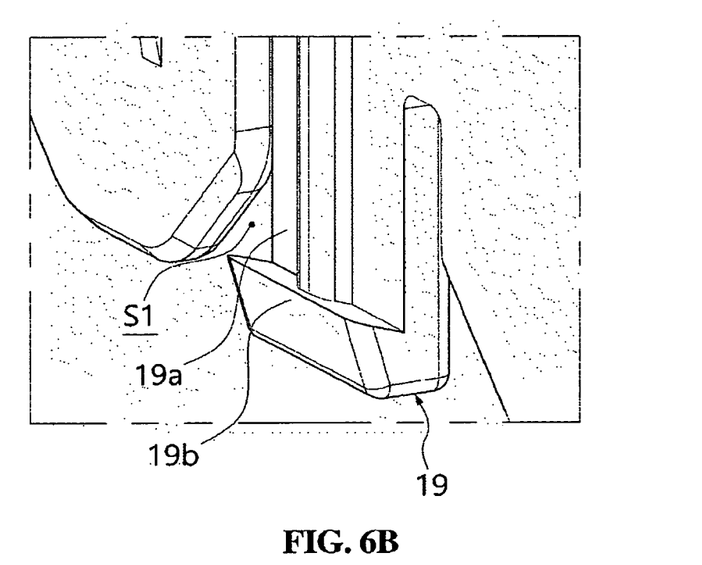
FIG. 6B is a perspective view of an essential portion showing a configuration of the wire locking piece that is provided on the main body according to the embodiment of the present invention.

As shown in FIGS. 6A and 6B, the main body 10 is provided with a wire locking piece 19. The wire locking piece 19 locks wires, which extend from components that are mounted to the battery block according to the present invention, to a location adjacent to the main body 10. To be more specific, the wire locking piece 19 is provided on a first side of the main body 10 by protruding, wherein a bundle of wires C that is made with a plurality of the wires is locked to the wire locking piece 19.

To achieve this, the wire locking piece 19 may be provided on the main body 10 at a location adjacent to a location where the power supply terminals 25A to 25D or a wire terminal T1 is mounted. That is because the wires extend from the power supply terminals 25A to 25D and the wire terminal T1. Thus, it is advantageous that the wire locking piece 19 is provided at a location where the bundle of wires can be easily locked.

The wire locking piece 19 includes a main body of the wire locking piece 19a, and a locking ridge 19b that protrudes from the main body of the wire locking piece 19a. The main body of the wire locking piece 19a is in a shape of cantilever, and the locking ridge 19b protrudes from one end of the main body of the wire locking piece 19a such that a locking means mentioned hereinbelow is locked to an upper part of the locking ridge 19b, thereby preventing the locking means from being separated.

Further, an evasion space S1 is provided on each of opposite sides of the wire locking piece 19 so as to form an opening for allowing the locking means (not shown) to pass therethrough. The locking means, for example, a cable tie, may be configured to tie the wire locking piece 19 and the bundle of wires C together. Of course, the locking means may be any structure that can tie the wire locking piece 19 and the bundle of wires C together.

Figure 7:
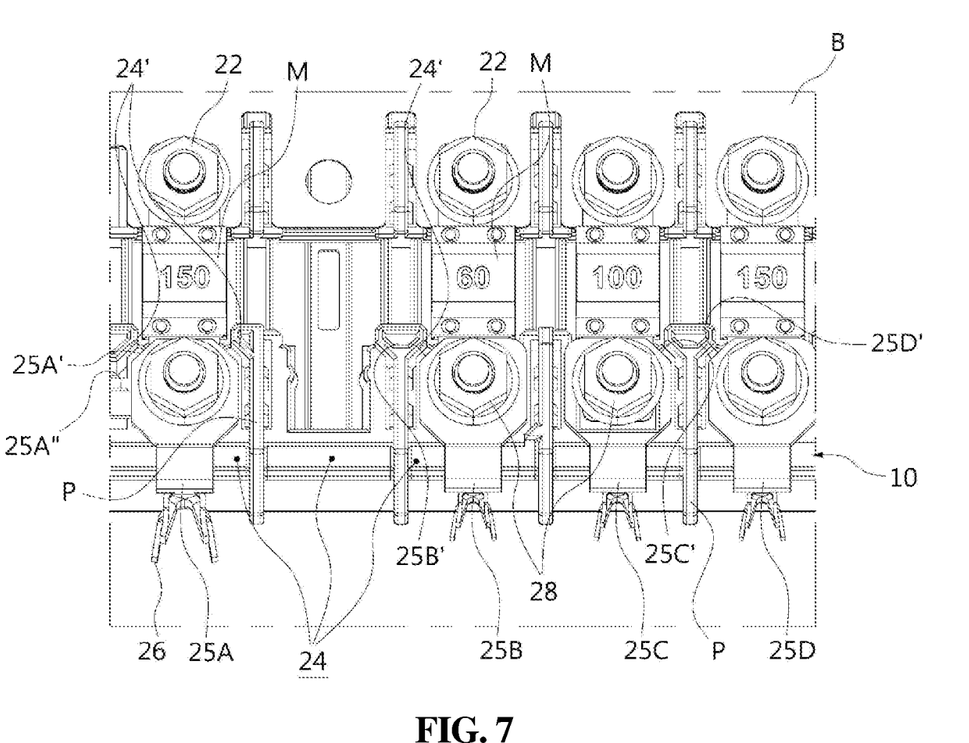
FIG. 7 is a perspective view of an essential portion showing a state where a plurality of power supply terminals are seated in an installation space of the main body according to the embodiment of the present invention.

As shown in FIG. 7, the installation space 11' of the main body 10 is provided with terminal seats 24. The terminal seats 24 are plural in number, wherein the power supply terminals 25A to 25D are seated in the terminal seats 24.

Hereinbelow, reference will be made to the power supply terminals 25A to 25D. The power supply terminals 25A to 25D are seated in the terminal seats 24, thereby being electrically connected to a midi fuse M, and thus the power supply terminals 25A to 25D are electrically connected to the bus bar B in a medium of the midi fuse M. Therefore, the power supply terminals 25A to 25D are supplied with electricity through the bus bar B, and then transmit the electricity to a vehicle.

To achieve this, a portion of each of the power supply terminals 25A to 25D is seated in the terminal seats 24, and each of the power supply terminals 25A to 25D is provided with a barrel 26 so as to be connected to the wires. In addition, the power supply terminals 25A to 25D are locked to the terminal seats 24 by using an attachment element 28.

Further, the midi fuse M is provided between each of the power supply terminals 25A to 25D and the bus bar B. A first end of the midi fuse M is locked to the attachment element 28 along with the power supply terminals 25A to 25D. A second end of the midi fuse M is connected with the bus bar B, and is locked to the main body 10 along with the bus bar B by using a bus bar locking element 22.

Hereinbelow, reference will be made to the terminal seats 24. Each shape of the terminal seats 24 is different from each other. In other words, shapes of the terminal seats 24 are different from each other depending on shapes of power supply terminals 25A to 25D that are seated in the respective terminal seats 24, whereby it is possible to reduce a mistake that a worker installs the power supply terminals 25A to 25D in the wrong terminal seats 24.

To be more specific, as shown in FIG. 7, a partition fence P is provided between each of the terminal seats 24 and a neighboring terminal seat 24 by protruding, wherein a distinction guide 24' is provided on one end of the partition fence P. The distinction guide 24' is connected to the partition fence P, and protrudes in such a manner that the distinction guide 24' makes the terminal seats 24 narrow. The distinction guide 24' is configured to correspond to each of slopes 25A' to 25D' of the power supply terminals 25A to 25D, whereby each of the power supply terminals 25A to 25D can be seated in one of the terminal seats 24 that corresponds thereto.

For example, a terminal seat 24 that is on a very left side based on FIG. 7 is provided with a pair of distinction guides 24' at each upper corner of the terminal seat 24. Thus, a power supply terminal 25A, which has a chamfer at each upper corner thereof, is capable of being seated in the terminal seat 24. Further, a terminal seat 24 that is on a very right side based on FIG. 7 is provided with a distinction guide 24' at an upper left corner of the terminal seat 24. Thus, a power supply terminal 25D, which has a chamfer at an upper left corner thereof, is capable of being seated in the terminal seat 24. Of course, a shape of the distinction guide 24' is not limited to a chamfer, so the distinction guide 24' may be in various shapes, such as a curved shape, a convex-concave shape, etc.

A distinction protrusion 25A" is provided on a very left side of the power supply terminals 25A to 25D based on FIG. 7. The distinction protrusion 25A" protrudes from a side of the power supply terminal 25A for allowing the power supply terminal 25A to be seated in only a terminal seat 24 where the distinction protrusion 25A" can be inserted. According to the embodiment of the present invention, only a very left terminal seat 24 is provided with a space where the distinction protrusion 25A" can be inserted.

Figure 8A:
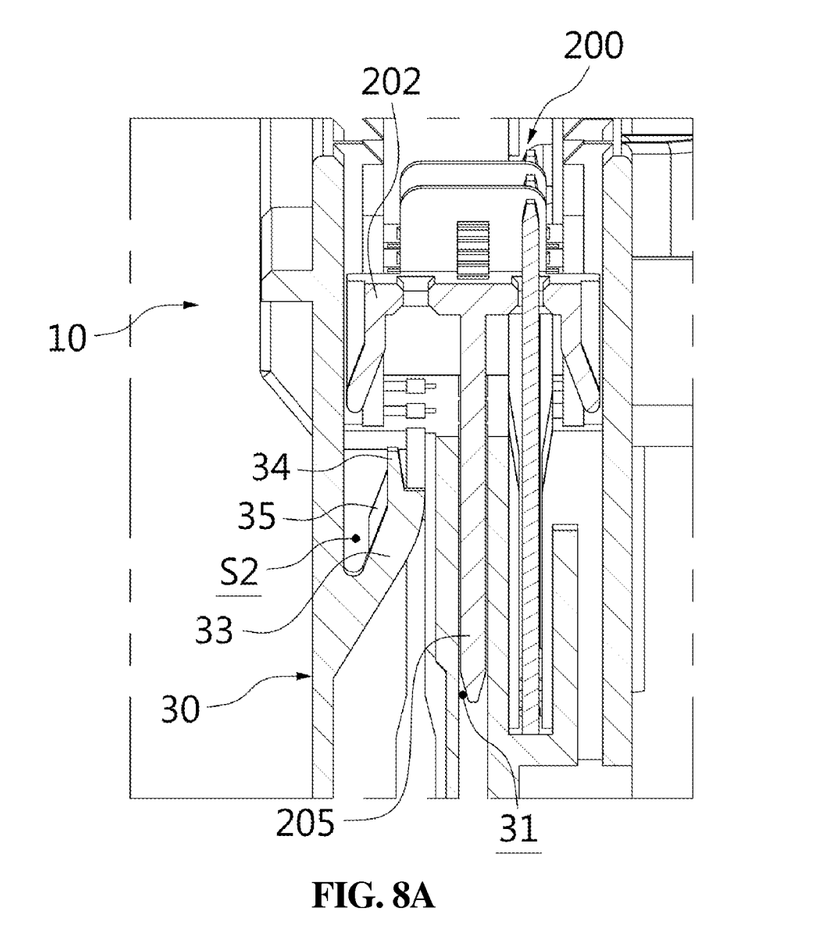
FIG. 8A is a sectional view of an essential portion showing a configuration of a mounting space of the main body according to the embodiment of the present invention.
Figure 8B:
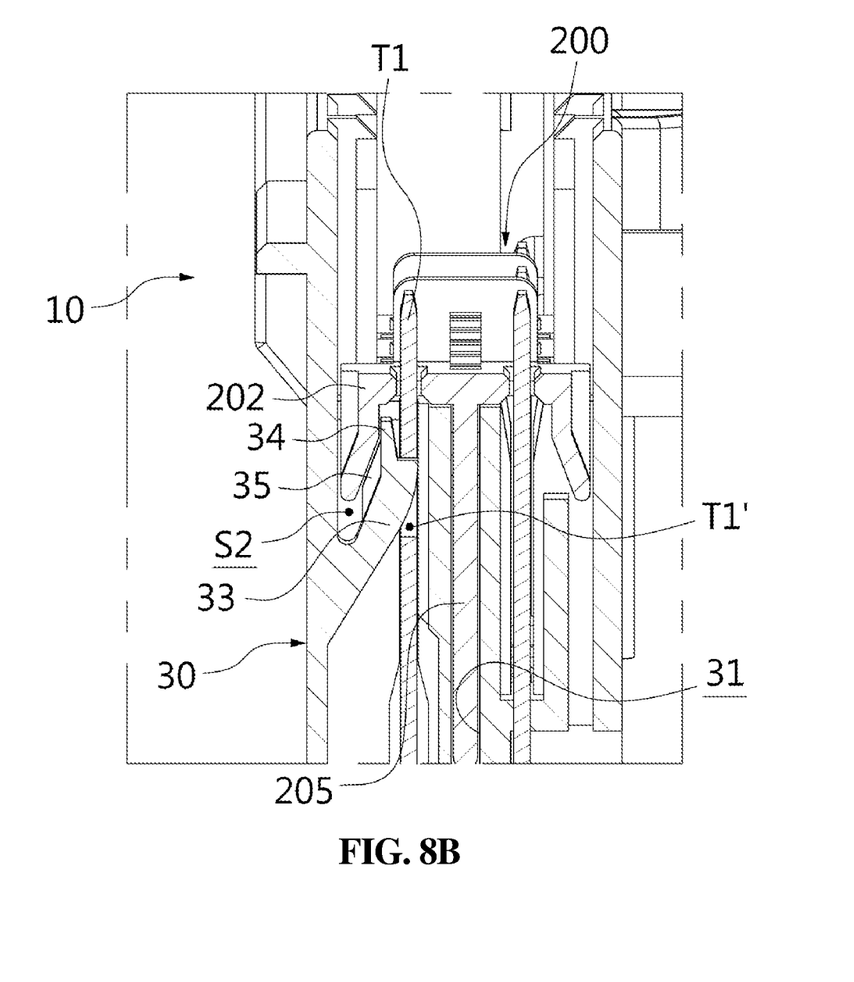
FIG. 8B is a sectional view of an essential portion showing a state where a wire terminal is mounted to the mounting space of the main body according to the embodiment of the present invention.

As shown in FIG. 8, the main body 10 is provided with a mounting space 30 that is open downwardly. A variety of electric devices, such as the wire terminal T1, the bus bar B, etc., are capable of being mounted to the mounting space 30, wherein a front holder 200 mentioned hereinbelow is mounted to the mounting space 30 so as to help the electric devices to be mounted to the mounting space 30 more securely.

The mounting space 30 is provided with a holder hole 31, wherein a guide main body 205 of a front holder 200 is inserted into the holder hole 31. In addition, a cantilever lance 33 that holds an end of the wire terminal T1 by catching the end of the wire terminal T1 is elastically deformably provided on one side of the holder hole 31. The lance 33 is inserted into a hooking hole T1' of the wire terminal T1 so as to prevent the wire terminal T1 from being separated downwardly based on FIG. 8A.

One side of the lance 33 is provided with an inclined rib 35 by protruding therefrom, wherein the inclined rib 35 corresponds to a pushing part 202 of the front holder 200 that is described hereinbelow. According to the embodiment of the present invention, the inclined rib 35 is configured to protrude and be inclined toward the pushing part 202 of the front holder 200 so as to correspond the pushing part 202.

An end of the lance 33 is provided with a rework protrusion 34. The rework protrusion 34 is capable of elastically deforming the lance 33 so as to disassemble the wire terminal T1, wherein the lance 33 is elastically deformed by hooking the rework protrusion 34 using a tool like a jig so that the hooking hole T1' of the wire terminal T1 can be unhooked from the lance 33.

Undescribed reference numeral S2 represents to a holder insertion space S2, wherein as shown in FIG. 8B, the pushing part 202 of the front holder 200 is inserted into the holder insertion space S2 so as to support a rear surface of the lance 33.

Hereinbelow, reference will be made to the front holder 200. The front holder 200 is inserted into the mounting space 30, wherein the front holder 200 is inserted into the mounting space 30 in an opposite direction that the wire terminal T1 is inserted into so that the wire terminal T1 can be locked firmly.

To achieve this, the pushing part 202 of the front holder 200 is inserted into the holder insertion space S2, thereby supporting the inclined rib 35 of the lance 33. Thus, the lance 33 is locked without elastic deformation, so the wire terminal T1 can be locked firmly without separation.

Here, the inclined rib 35 and the pushing part 202 are configured to be inclined in a corresponding manner such that the inclined rib 35 comes into close contact with the pushing part 202. Thereby, the pushing part 202 and the inclined rib 35 support each other so that by small degree of protrusion, they can prevent deformation of the lance 33.

The guide main body 205 of the front holder 200 extends in one direction, and is inserted into the holder hole 31. Thereby, the front holder 200 is guided in a predetermined direction so as to be mounted to the mounting space 30.

Hereinbelow, reference will be made to the upper casing 50 according to the embodiment of the present invention. An exterior and a frame of the upper casing 50 are dependent on a hexahedral shaped casing main body 51. The upper casing 50 is coupled to the main body 10 such that the main body 10 covers the installation space 11' so as not to be exposed to the outside.

An outer surface of the upper casing 50 is provided with a plurality of coupling levers 53. The coupling levers 53 are provided for being coupled with the main body 10. To be more specific, the coupling levers 53 are hooked on the coupling element 13 of the main body 10, thereby allowing the upper casing 50 and the main body 10 to be assembled together. Here, the coupling levers 53 are capable of being elastically deformed so that the coupling levers 53 can detach the upper casing 50 from the main body 10 by decoupling the coupling element 13 from the coupling levers 53 via elastic deformation.

The upper casing 50 is provided with a terminal cover 55. The terminal cover 55 is rotatably provided on the upper casing 50, whereby the terminal cover 55 selectively opens a portion of the main body 10. According to the embodiment of the present invention, the terminal cover 55 is detachably locked to a second side of the main body 10 by using a cover lever 53'. As shown in FIG. 2, when the terminal cover 55 is opened, a post locking element TP that is provided in the main body 10 is exposed. The post locking element TP is provided for being connected to a connecting post that is provided in the vehicle battery 100, wherein the post locking element TP fastens the connecting post. Undescribed reference numeral 56 references to a hinge that connects the terminal cover 55 to the upper casing 50, wherein according to the embodiment of the present invention the hinge is integrally provided in the upper casing 50 via injection molding.

Hereinbelow, reference will be made to an operation of the battery block for a vehicle according to the embodiment of the present invention.

Now, reference will be made to a process of mounting the bus bar B to the main body 10 with reference to FIG. 5. Before mounting the upper casing 50 to the main body 10, a worker locks the bus bar B to the installation space 11' of the main body 10.

To achieve this, the locking protrusion 17 that is provided in the installation space 11' must pass through the locking hole on the bus bar B, wherein the pair of locking fingers 17a that is provided on the locking protrusion 17 is moved in a direction to be close to each other and then restores to an original shape thereof via elastic deformation, thereby locking the bus bar B by hooking an edge of the locking hole on the bus bar B.

For reference, the edge of the locking hole has a chamfer so that a head portion of the locking protrusion 17 can be easily inserted into the locking hole. In addition, the reinforcing rib 18 that is provided on the outer surface of the locking fingers 17a prevents plastic deformation of the locking fingers 17a by increasing the strength of the locking fingers 17a.

Now, reference will be made to a process of seating the power supply terminals 25A to 25D according to the embodiment of the present invention in the main body 10 with reference to FIG. 7. Firstly, the midi fuse M along with the bus bar B, which was described hereinbefore, is mounted to the main body 10.

With the midi fuse M along with the bus bar B being mounted to the main body 10, the power supply terminals 25A to 25D are seated in the terminal seats 24 where the first end of the midi fuse M is seated. Here, each of the power supply terminals 25A to 25D and each of the terminal seats 24 are configured to correspond to each other, whereby only one of the power supply terminals 25A to 25D can be seated in one of the terminal seats 24 that corresponds thereto.

To be more specific, the distinction guides 24' that are provided on the terminal seats 24 make the terminal seats 24 different from each other, whereby each shape of the terminal seats 24 corresponds to each of the power supply terminals 25A to 25D. Thus, a worker can tell a difference between the terminal seats 24, and can install the power supply terminals 25A to 25D correctly, thereby preventing misassembly.

When the power supply terminals 25A to 25D are seated in the terminal seats 24, the power supply terminals 25A to 25D along with the first end of the midi fuse M are coupled to the terminal seats 24 using the attachment element 28, whereby the power supply terminals 25A to 25D are locked.

Now, reference will be made to a process of mounting the wire terminal T1 to the mounting space 30 of the main body 10 with reference to FIG. 8. Firstly, the front holder 200 is temporarily locked to the mounting space 30 of the main body 10. FIG. 8A is a view of showing a state where the front holder 200 is temporarily locked to the mounting space 30.

With the front holder 200 being temporarily locked to the mounting space 30, the wire terminal T1 is inserted from a lower part of the mounting space 30 to an upper part thereof. When the wire terminal T1 is inserted, the lance 33 in the mounting space 30 is elastically deformed by the wire terminal T1. And then, when the lance 33 is inserted into the hooking hole T1' on the wire terminal T1, the lance 33 restores original shape thereof and is hooked.

In the state mentioned above, as shown in FIG. 8B, when the front holder 200 moves downwardly, the pushing part 202 of the front holder 200 supports the rear surface of the lance 33. To be more specific, the pushing part 202 of the front holder 200 comes into close contact with the inclined rib 35 of the lance 33, thereby preventing the lance 33 from being elastically deformed. Therefore, the wire terminal T1 can be firmly locked to the mounting space 30.

Now, reference will be made to a process of locking the wires with reference to FIG. 6. Firstly, when the wire terminal T1 or the power supply terminals 25A to 25D are mounted to the main body 10, the wires extend downwardly from the wire terminal T1 or the power supply terminals 25A to 25D. A worker gathers the wires into the bundle of wires C, and then locks the bundle of wires C to the wire locking piece 19 that is provided in the main body 10.

To be more precise, after the locking means that can tie the bundle of wires C is prepared, the locking means wraps the bundle of wires C and the wire locking piece 19 simultaneously, whereby the bundle of wires C is locked to the wire locking piece 19. In other words, the locking means is inserted through the evasion space S1, which is provided on each of opposite sides of the wire locking piece 19, and is tied in a state where the locking means wraps the bundle of wires C, thereby being capable of locking the bundle of wires C. The locking means is a cable tie according to the embodiment of the present invention.

Although a preferred embodiment of the present invention has been described for illustrative purposes, those skilled in the art will appreciate that various modifications, additions and substitutions are possible, without departing from the scope and spirit of the present invention as disclosed in the accompanying claims.

What is claimed is:

1. A battery block for a vehicle, the battery block comprising:
   a main body provided with an installation space therein for receiving components; and
   an upper casing mounted to an upper part of the main body, a lower surface of the main body mounted to an upper part of a vehicle battery,
   wherein the main body includes a longitudinal side wall disposed along a longitudinal direction of the main body,
   wherein the longitudinal side wall includes:
      a longitudinal side plate;
      a first, a second and a third vertical transverse plates each crossing the longitudinal side plate at a first, a second and a third locations thereof:
      a first horizontal plate crossing the longitudinal side plate, thereby extending inwardly and outwardly from the longitudinal side plate, and having one end connected to the first vertical transverse plate and another end connected to the second vertical transverse plate; and a second horizontal plate crossing the longitudinal side plate, thereby extending inwardly and outwardly from the longitudinal side plate, and having one end connected to the second vertical transverse plate and another end connected to the third vertical transverse plate, wherein a first height of the longitudinal side plate, defined from an upper end of the longitudinal side plate to an upper surface of the first horizontal plate, is shorter than a second height of the longitudinal side plate, defined from the upper end of the longitudinal side plate to an upper surface of the second horizontal plate.

2. The battery block of claim 1, wherein the main body includes:
   a mounting space that is open downwardly;
   a cantilever lance elastically deformably provided in the mounting space and configured to hold an end of a wire terminal by catching the end of the wire terminal; and
   a front holder selectively mounted to the mounting space, so as to prevent or allow elastic deformation of the lance.

3. The battery block of claim 2, wherein one side of the lance is provided with an inclined rib by protruding, the inclined rib corresponding to a pushing part of the front holder, wherein the inclined rib is configured to be inclined toward the pushing part of the front holder such that when the front holder is mounted to the mounting space, and wherein an outer surface of an inclined rib of the front holder comes into close contact with an outer surface of the inclined rib of the lance.

4. The battery block of claim 2, wherein the installation space of the main body is provided with a plurality of terminal seats, and wherein shapes of the terminal seats are different from each other depending on shapes of power supply terminals that are seated in the respective terminal seats.

5. The battery block of claim 4, wherein a partition fence is provided between each of the terminal seats and a neighboring terminal seat by protruding, with a distinction guide being provided on one end of the partition fence by protruding, and wherein the terminal scats have respective distinction guides different from each other in shapes and numbers such that the shapes of the plurality of the terminal seats are different from each other.

6. The battery block of claim 1, wherein the main body includes:
   a locking protrusion, the locking protrusion being inserted into a locking hole on a bus bar;
   a pair of locking fingers elastically deformably provided on the locking protrusion in such a manner that the locking fingers are moved in opposed or opposite directions to be close to or moved apart from each other; and
   a reinforcing rib provided by protruding on an outer surface of each locking finger along a longitudinal direction thereof.

7. The battery block of claim 6, wherein an edge of the locking hole that is provided on the bus bar and is engaged with the locking protrusion has a chamfer that makes a sloping edge.

8. The battery block of claim 4, wherein a wire locking piece is provided on the main body by protruding at a location adjacent to a location where each of the power supply terminals or the wire terminal is mounted, an evasion space is provided on each of opposite sides of the wire locking piece so as to form an opening for allowing a locking means to pass therethrough, and a protruding rib is provided on a rear surface of the wire locking piece along a longitudinal direction of the wire locking piece.

* * * * *